US008135032B2

(12) United States Patent
Tu et al.

(10) Patent No.: US 8,135,032 B2
(45) Date of Patent: Mar. 13, 2012

(54) RATE ADAPTATION METHOD FOR COMMUNICATION SYSTEMS

(75) Inventors: Yung Szu Tu, Jhubei (TW); Jiunn Tsair Chen, Jhubei (TW)

(73) Assignee: Ralink Technology Corporation, Jhubei, Hsinchu County (TW)

( * ) Notice: Subject to any disclaimer, the term of this patent is extended or adjusted under 35 U.S.C. 154(b) by 110 days.

(21) Appl. No.: 12/498,960

(22) Filed: Jul. 7, 2009

(65) Prior Publication Data

US 2010/0135320 A1 Jun. 3, 2010

(30) Foreign Application Priority Data

Nov. 28, 2008 (TW) .............................. 97146118 A

(51) Int. Cl.
*H04J 3/22* (2006.01)
*H04L 1/14* (2006.01)
*H04B 1/10* (2006.01)
(52) U.S. Cl. ......... 370/468; 370/252; 375/254; 714/750
(58) Field of Classification Search .................. 370/252, 370/468, 310, 335, 332–333, 395.64; 714/748–749, 714/750; 375/225, 254
See application file for complete search history.

(56) References Cited

U.S. PATENT DOCUMENTS

| 7,525,916 | B2 * | 4/2009 | Kikuma ....................... 370/235 |
| 7,639,735 | B1 * | 12/2009 | Dick et al. .................... 375/227 |
| 7,668,085 | B2 * | 2/2010 | Vannithamby et al. ....... 370/229 |
| 7,680,219 | B2 * | 3/2010 | Keller et al. .................. 375/341 |
| 7,724,640 | B2 * | 5/2010 | Larsson ........................ 370/216 |
| 2004/0264588 | A1 * | 12/2004 | Song et al. .................... 375/260 |
| 2005/0013303 | A1 * | 1/2005 | Gopalakrishnan et al. ................. 370/395.21 |
| 2005/0163072 | A1 * | 7/2005 | Park et al. ..................... 370/328 |
| 2006/0234346 | A1 * | 10/2006 | Retallack et al. ............. 435/69.1 |
| 2006/0234646 | A1 * | 10/2006 | Naguib et al. ................. 455/69 |
| 2008/0063106 | A1 * | 3/2008 | Hahm et al. .................. 375/267 |

* cited by examiner

*Primary Examiner* — Kwang B Yao
*Assistant Examiner* — Candal Elpenord
(74) *Attorney, Agent, or Firm* — Hamre, Schumann, Mueller & Larson, P.C.

(57) ABSTRACT

A rate adaptation method comprises the steps of: updating the probability density function of the SNR of a transmitted signal according to the receiving status of the transmitted signal and the probability density function before update; and updating the transmission rate of the transmitted signal according the updated probability density function.

18 Claims, 14 Drawing Sheets

RATE ADAPTATION METHOD FOR COMMUNICATION SYSTEMS

BACKGROUND OF THE INVENTION

1. Field of the Invention

The present invention relates to an application for a communication system, and more particularly, to a rate adaptation method for a communication system.

2. Description of the Related Art

Communication systems, especially wireless communication systems, operate in a transmission environment that is constantly varying due to a multitude of factors, such as weather, transmission distance, velocity of transmitter or receiver, and noise. Therefore, the initial transmission rate of a communication system may not be suited for the transmission environment at a later time. If a higher transmission rate is acceptable for the varied transmission environment, then the communication system wastes available transmission resources. On the other hand, if the original transmission rate is not acceptable for the varied transmission environment, then the transmission throughput will drop tremendously. Therefore, there is a need for a communication system to adjust the transmission rate according to the varying transmission environment.

Most conventional rate adaptation methods update the transmission rate based on a transmitted probe signal or the signal quality of the received signal at the receiver within a fixed period. Auto rate fallback (ARF) and adaptive ARF (AARF) algorithms transmit probe packets to determine whether a higher transmission rate is achievable, and lower the transmission rate if transmission failure occurs successively. A sample rate algorithm transmits probe packets of different modulations and transmission rates periodically, and determines a transmission rate based on the receiving status of the transmitted probe packets. However, the aforementioned conventional rate adaptation methods all require additional probe packets such that the transmission throughput is reduced, and thus are not practical.

Onoe algorithm, adaptive multi-rate retry (AMRR) algorithm, Madiff algorithm and robust rate adaptation algorithm (RRAA) are examples of rate adaptation methods. Onoe algorithm raises the transmission rate when the packet error rate is below 10% a successive number of times, and lowers the transmission rate when the average packet retry rate is greater than 1. AMRR algorithm and Madiff algorithm adopt the thresholds of two packet correct rates to determine whether to raise or lower the transmission rate. RRAA algorithm determines transmission rate based on the ACK signals of transmitted signals and the packet correct rate. However, the aforementioned conventional rate adaptation methods all require waiting or measuring the transmission quality for a period of time. Madiff algorithm, AMRR algorithm and RRAA algorithm, for example, all require at least ten packets for the determination of transmission rate. Therefore, these rate adaptation methods converge too slowly.

In view of the disadvantages of the conventional rate adaptation methods, there is a need to design a rate adaptation method which not only would not reduce the transmission throughput, but also converges quickly to the optimum transmission rate.

SUMMARY OF THE INVENTION

The embodiments of the present invention disclose a rate adaptation method for a communication system. The rate adaptation method updates the probability density function of the signal to noise ratio of a transmission signal as soon as an ACK signal or a NACK signal is received, and updates the transmission rate of the transmission signal according to the updated probability density function. Therefore, compared to conventional rate adaptation methods, the rate adaptation method in the embodiments of the present invention is more accurate, converges more quickly and the transmission throughput is not affected.

The rate adaptation method for communication systems according to one embodiment of the present invention comprises the steps of: updating a probability density function of the signal to noise ratio of a transmission signal according to the probability density function and the receiving status of the transmission signal; and updating the transmission rate of the transmission signal according to the updated probability density function.

The rate adaptation method for communication systems according to another embodiment of the present invention comprises the steps of: an initial step for initializing a probability density function of the signal to noise ratio of a transmission signal; a transmission rate update step for updating a transmission rate; and a probability density function update step for updating the probability density function.

BRIEF DESCRIPTION OF THE DRAWINGS

The objectives and advantages of the present invention will become apparent upon reading the following description and upon referring to the accompanying drawings of which.

DETAILED DESCRIPTION OF THE INVENTION

Figure 1:
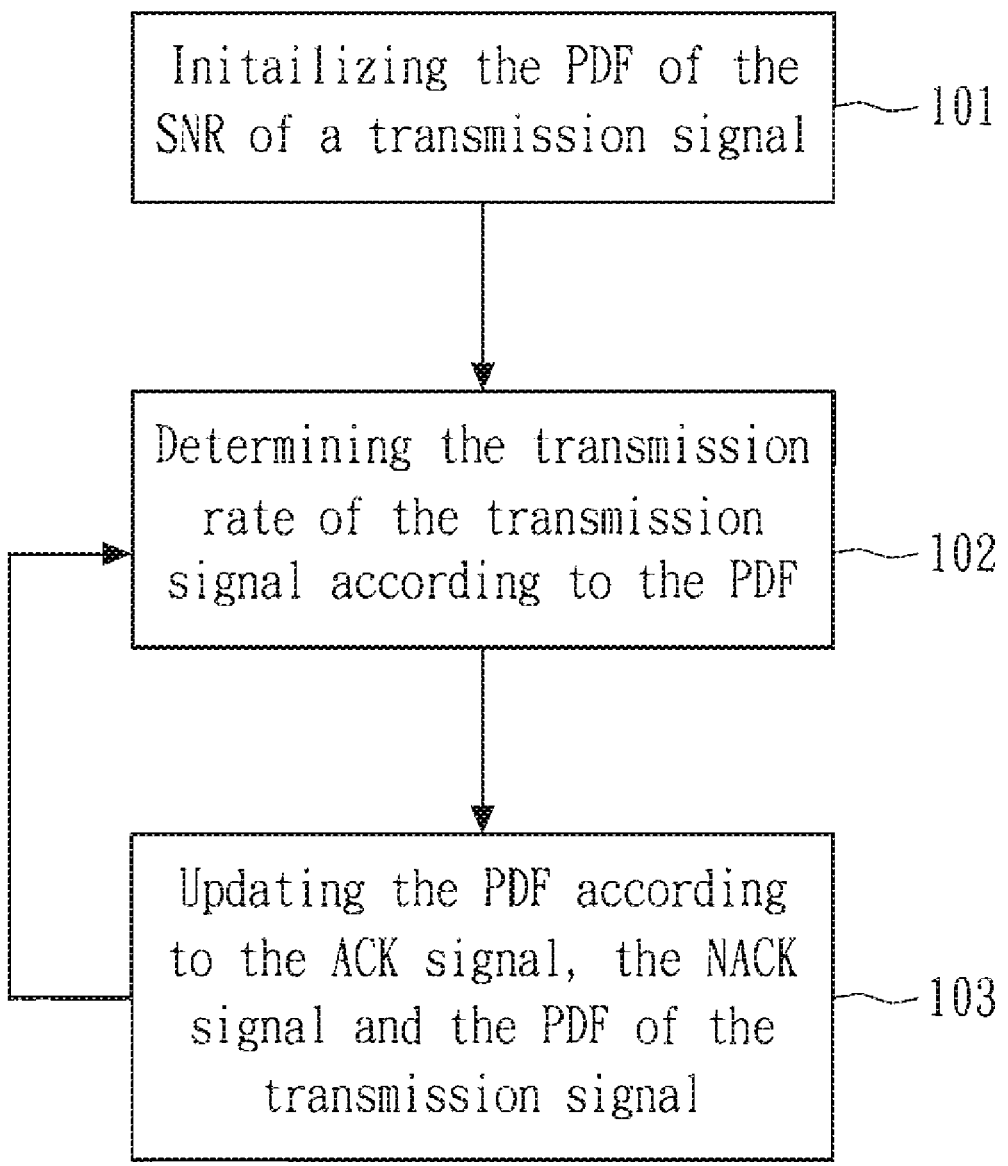
FIG. 1 shows the flow chart of a rate adaptation method according to one embodiment of the present invention.

FIG. 1 shows the flow chart of a rate adaptation method according to one embodiment of the present invention. In step 101, the probability density function (PDF) of the signal to noise ratio (SNR) of a transmission signal is initialized, and step 102 is executed. In step 102, the transmission rate of the transmission signal is determined according to the PDF, and step 103 is executed. In step 103, the PDF is updated according to the ACK signal, the NACK signal and the PDF of the transmission signal, and step 102 is executed.

Given the received signal strength indication (RSSI), the transmission rate of transmitted packets and the corresponding ACK signals and NACK signals, the PDF of the SNR of a communication system is defined as:

$$p(SNR \mid RSSI, ACKs, MCSs) = \frac{p(SNR \mid RSSI) \prod_{i=0}^{N} p(SNR \mid ACKi, MCSi)}{p(SNR)^{N+1}},$$

wherein MCS is the transmission rate and N is the number of transmitted packets. According to conditional probability formula:

$$p(SNR \mid ACK, MCS) = \frac{p(ACK \mid MCS, SNR)p(SNR)}{p(ACK \mid MCS)}.$$

Substituting the conditional probability formula into the PDF, the following function is obtained:

$$p(SNR \mid RSSI, ACKs, MCSs) = p(SNR \mid RSSI) \prod_{i=0}^{N} \frac{p(ACKi \mid MCSi, SNR)}{p(ACKi \mid MCSi)},$$

wherein p(SNR|RSSI) is the PDF of the SNR of the transmission signal if the ACK signals, the NACK signals and the transmission rate are all unknown, that is, the initial PDF of the SNR of the transmission signal. p(ACK|MCS,SNR), which can be calculated beforehand, is the probability distribution function for receiving the ACK signals for different SNRs given a known transmission rate. p(ACK|MCS), which also can be calculated beforehand, is the probability for receiving the ACK signals given a known transmission rate.

Figure 2A:
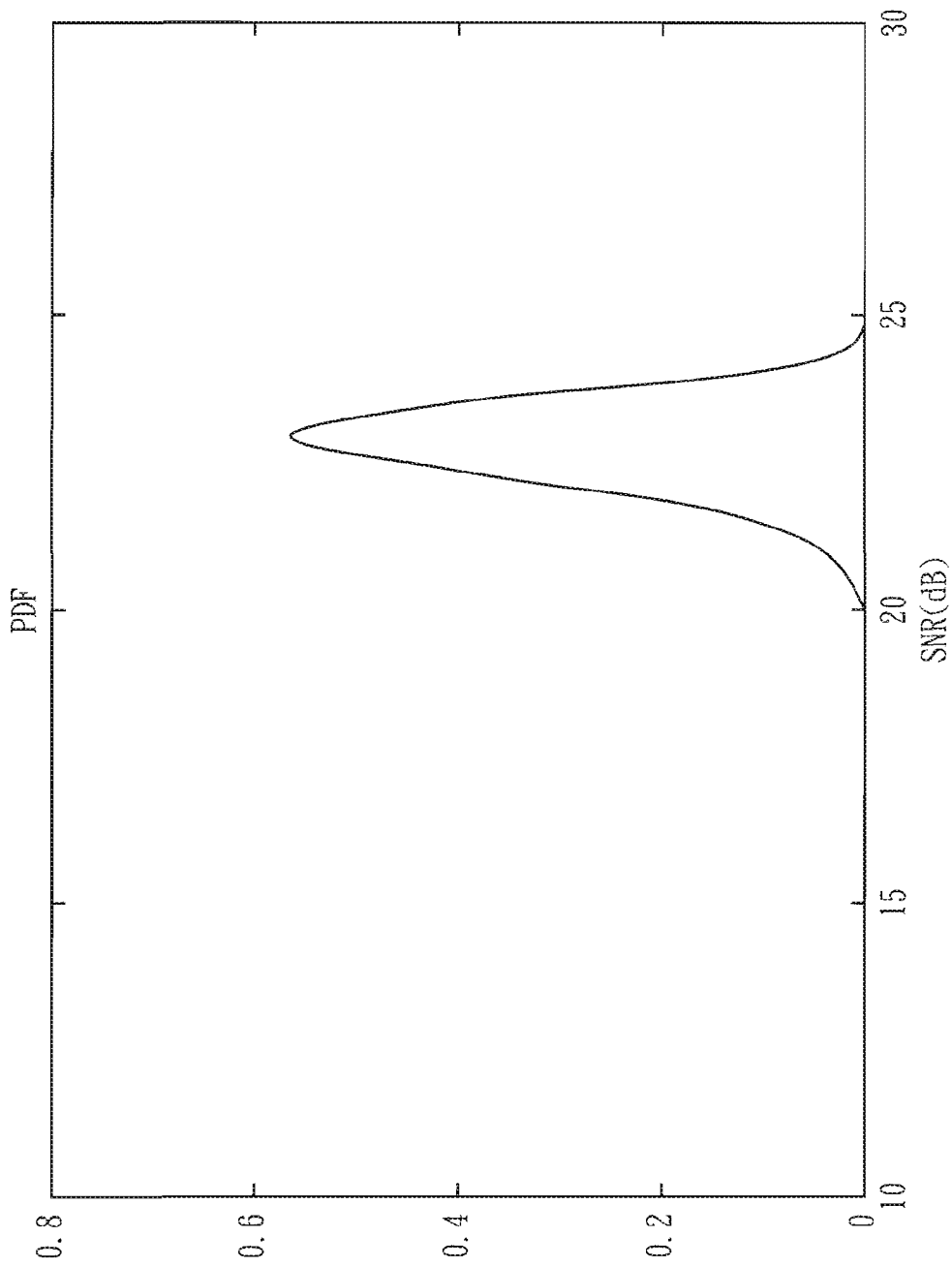
FIGS. 2A and 2B show the initial probability density functions of transmission signals according to one embodiment of the present invention.
Figure 2B:
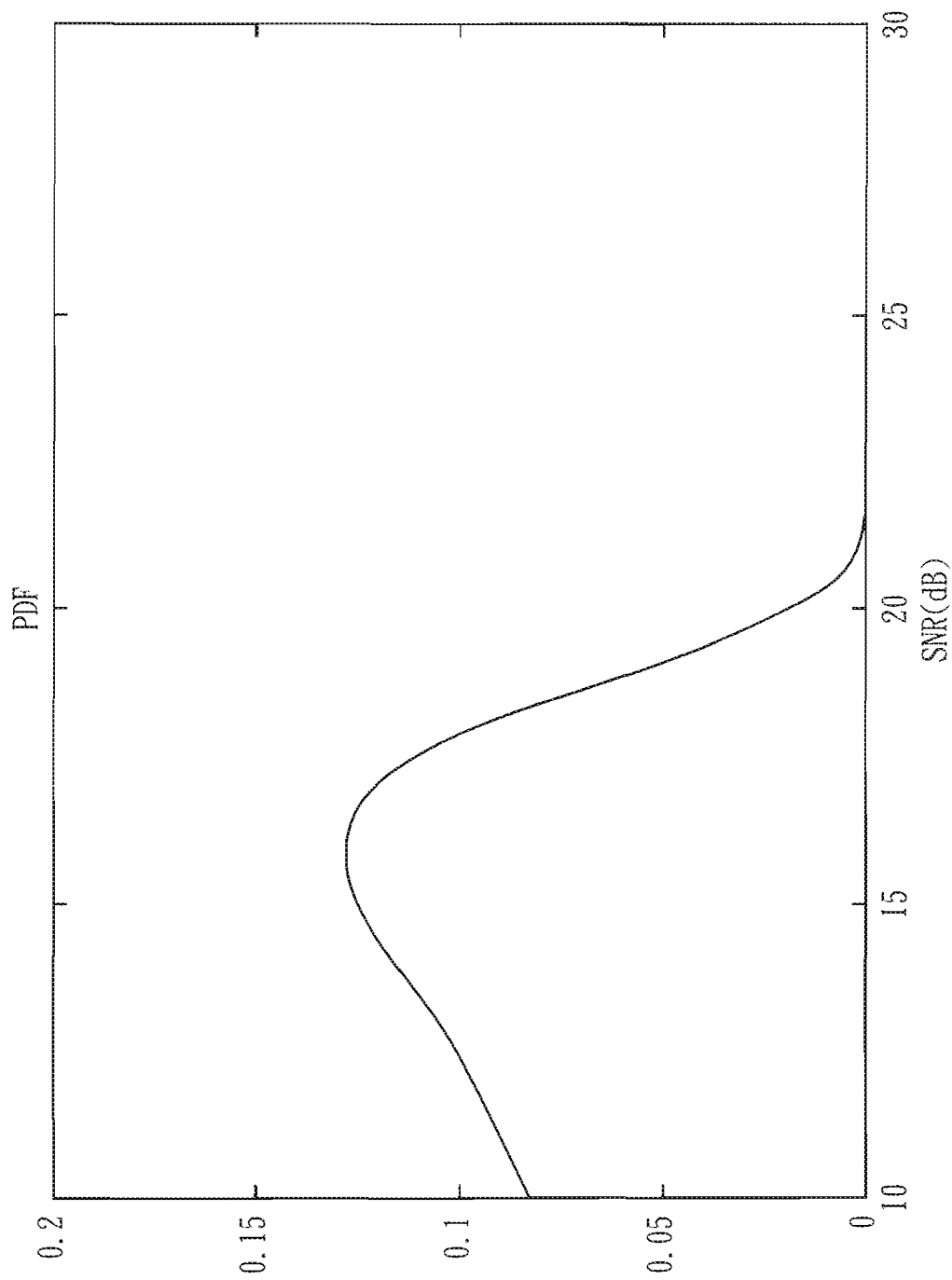

Referring to FIG. 1, in step 101, the PDF of the SNR of a transmission signal p(SNR|RSSI) is initialized according to different RSSIs. FIG. 2 shows two different initial PDF p(SNR|RSSI). The average SNR of the PDF in FIG. 2A is 24 dB. The average SNR of the PDF in FIG. 2B is 16 dB. In step 102, the transmission rate $MCS_1$ is determined according to the PDF p(SNR|RSSI). In step 103, if an ACK signal is received, the PDF p(SNR|RSSI) is multiplied by p(ACK|$MCS_1$,SNR) and divided by p(ACK|$MCS_1$) to obtain an updated PDF. In step 103, if a NACK signal is received, or no signal is received for a specific period of time, then it is determined that a NACK signal is received. At this point, the PDF p(SNR|RSSI) is multiplied by p(NACK|$MCS_1$,SNR), i.e. 1−p(ACK|$MCS_1$,SNR), and divided by p(NACK|$MCS_1$), i.e. 1−p(ACK|$MCS_1$) to obtain an updated PDF. After the PDF of the SNR of the transmission signal is updated, a new transmission rate is determined accordingly, as described in step 102.

Figure 3:
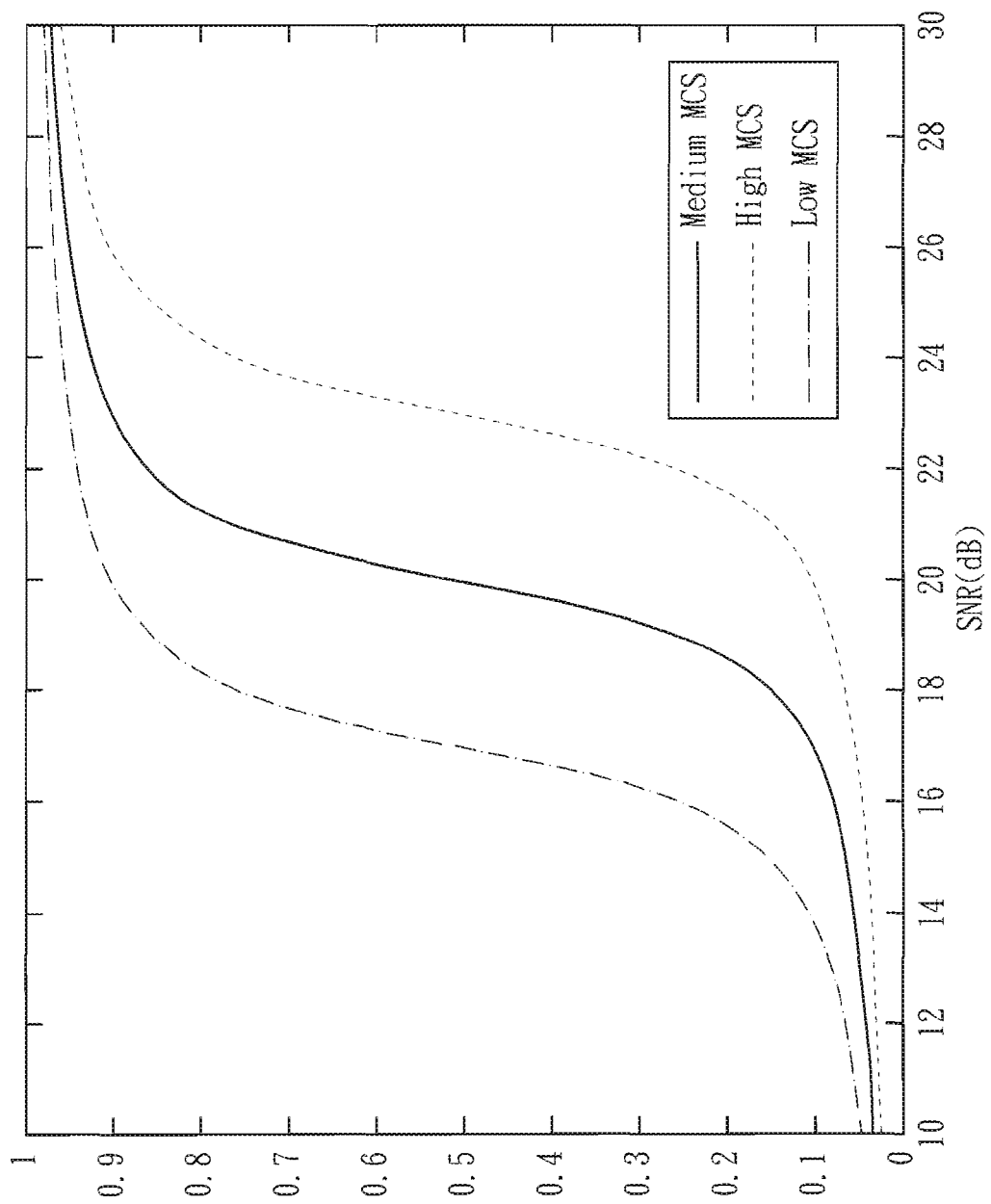
FIG. 3 shows the probability distribution function for receiving ACK signals under different transmission rates according to one embodiment of the present invention.
Figure 4:
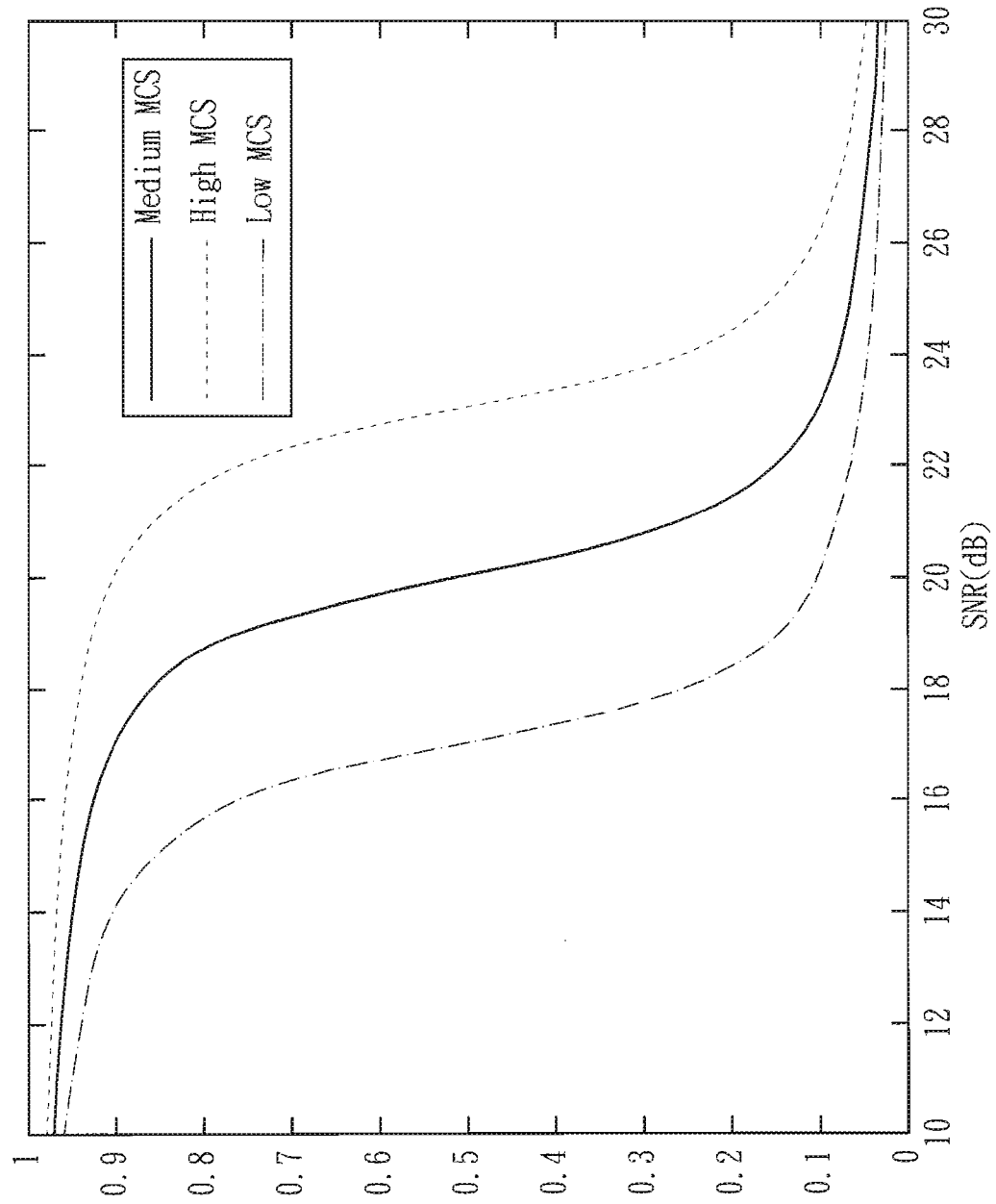
FIG. 4 shows the probability distribution function for receiving NACK signals under different transmission rates according to one embodiment of the present invention.
Figure 5A:
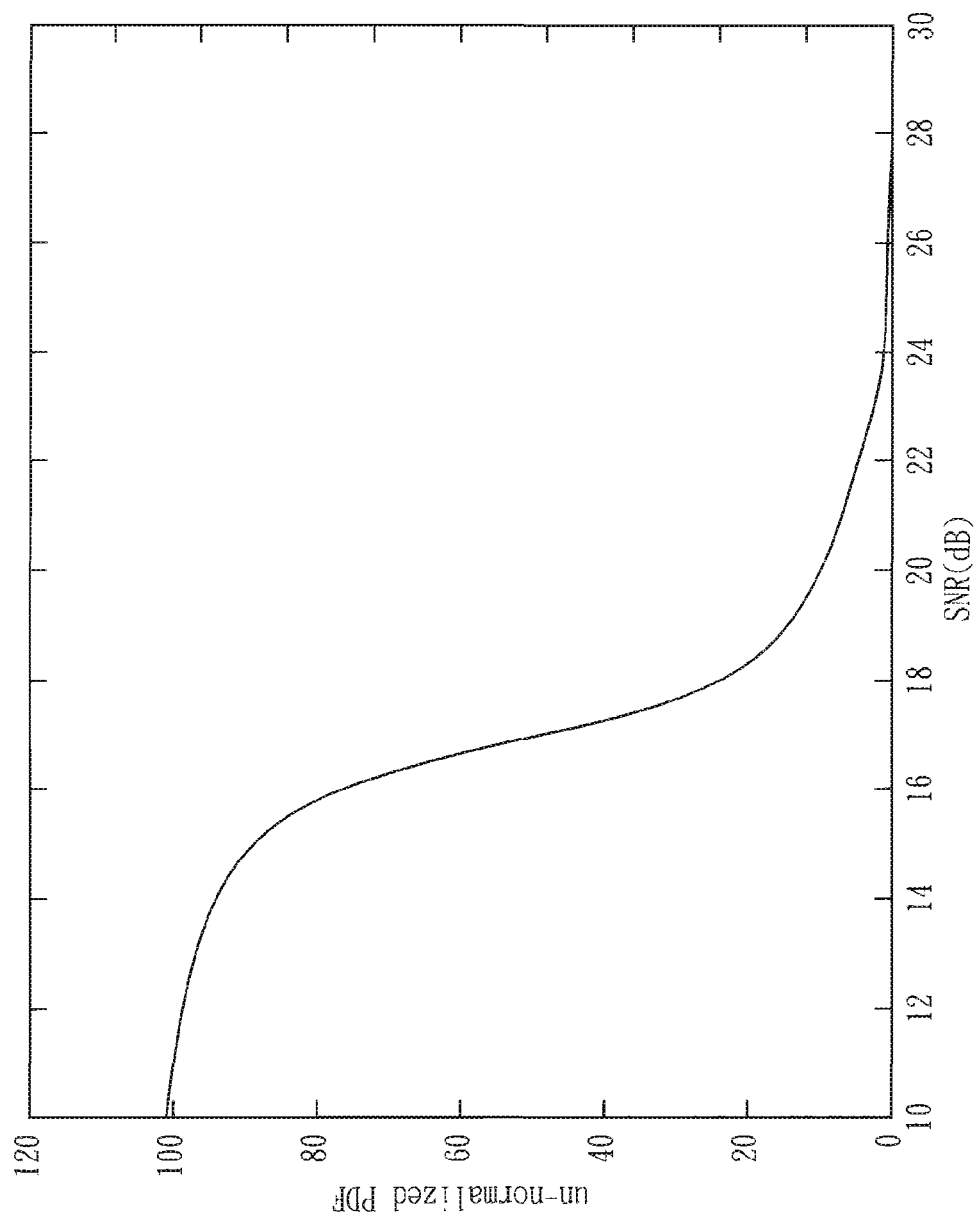
FIGS. 5A to 5D show the simulation results according to the rate adaptation method of one embodiment of the present invention.
Figure 5B:
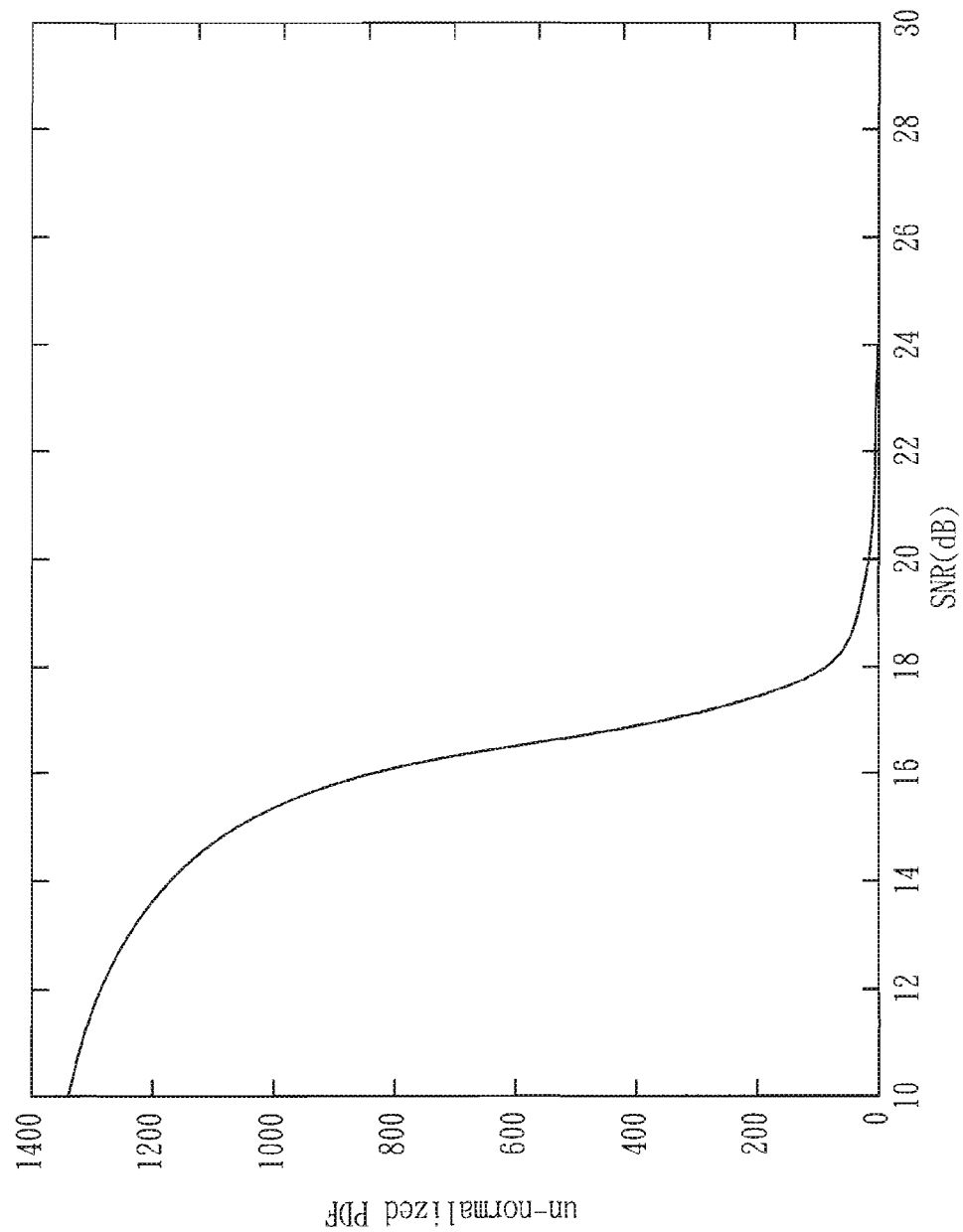
Figure 5C:
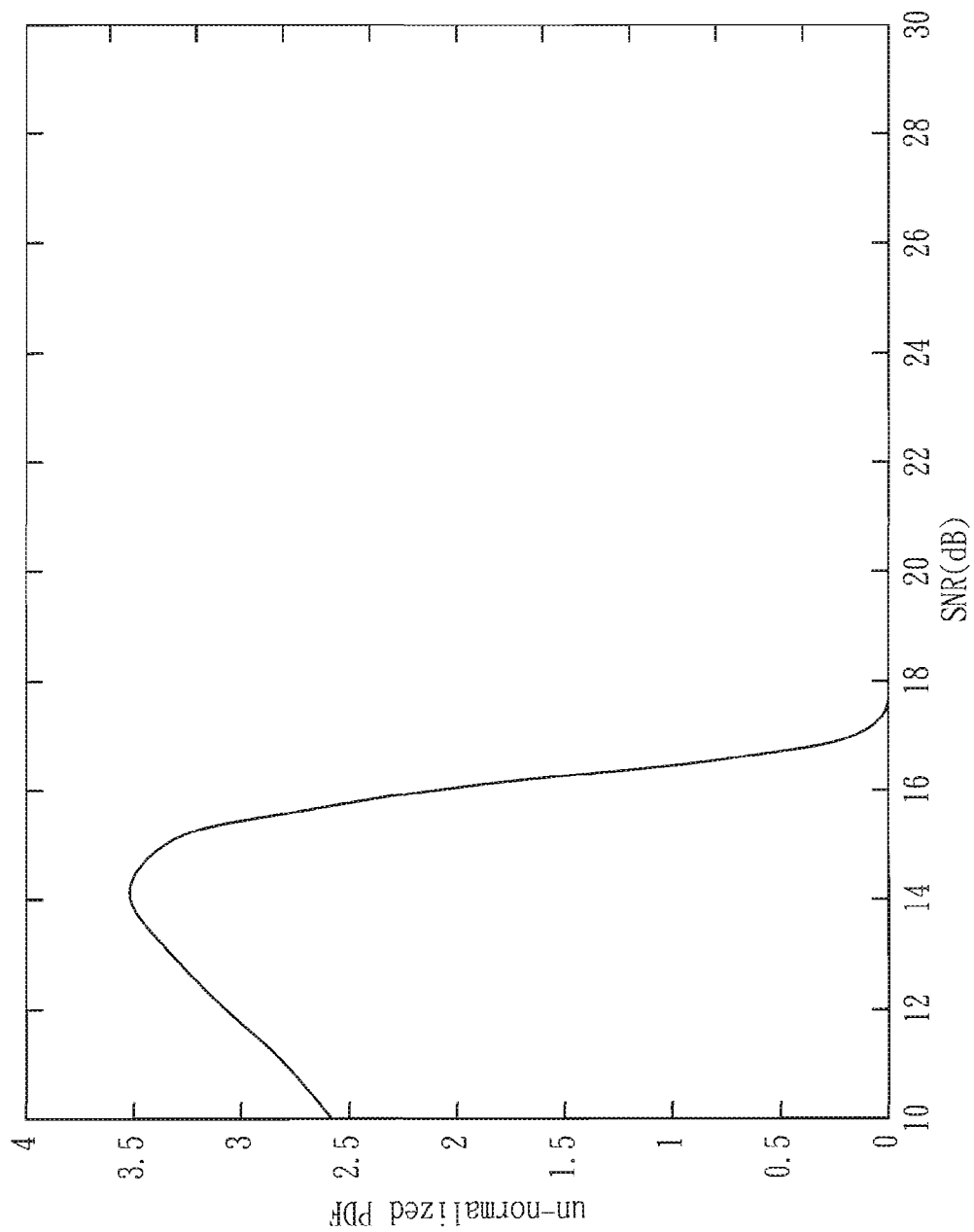
Figure 5D:
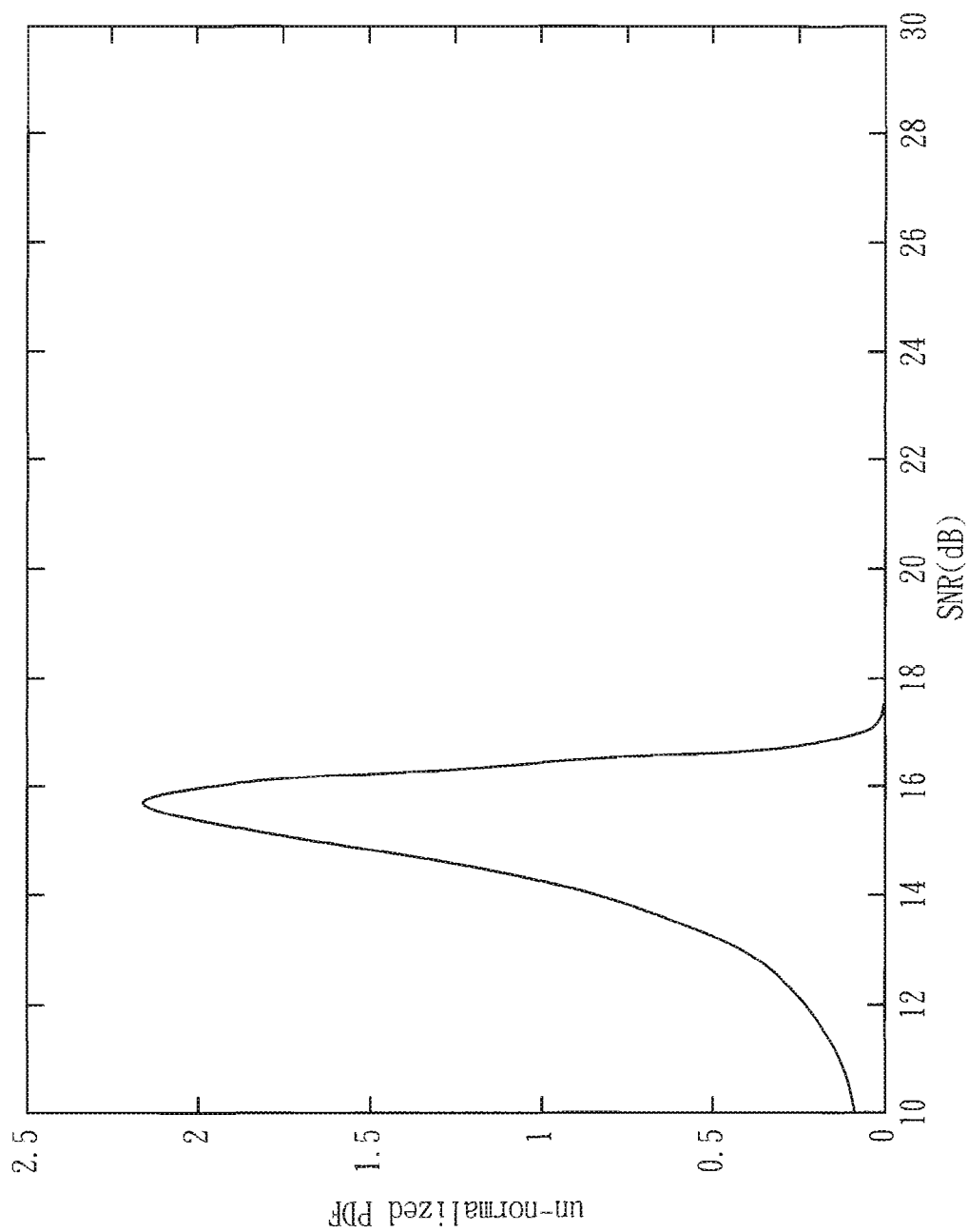

FIG. 3 shows the probability distribution function p(ACK|MCS,SNR) under different transmission rates. As shown in FIG. 3, under the same SNR, if the transmission rate is higher, then the probability of receiving ACK signals is lower. FIG. 4 shows the probability distribution function p(NACK|MCS,SNR) under different transmission rates. As shown in FIG. 4, p(NACK|MCS,SNR) is equal to 1−p(ACK|MCS,SNR).

FIG. 5 shows the simulation result according to the rate adaptation method of the present embodiment. Since the PDF p(ACK|MCS) and p(NACK|MCS) are not functions of SNR, dividing the PDF function p(SNR|RSSI,ACKs,MCSs) with these PDF functions does not alter its shape. Therefore, in this simulation the dividing operation is omitted to reduce the computation complexity. FIGS. 5A to 5D show the un-normalized probability density function, i.e. the shape of the probability density function, updated by twice, thrice, ten times and twenty times. As shown in FIG. 5, after plenty of times of update, the standard deviation of the probability density function becomes smaller. Also, the shape of the probability density function becomes more concentrated, which means the probability density function is converging.

Since the rate adaptation method of the present embodiment utilizes all of the received the ACK signals, compared to the conventional rate adaptation method, which only counts the ACK signals in a certain period of time, the accuracy of the rate adaptation method of the present embodiment is higher than that of the conventional rate adaptation method, and the rate adaptation method of the present embodiment can provide a better transmission rate.

Figure 6:
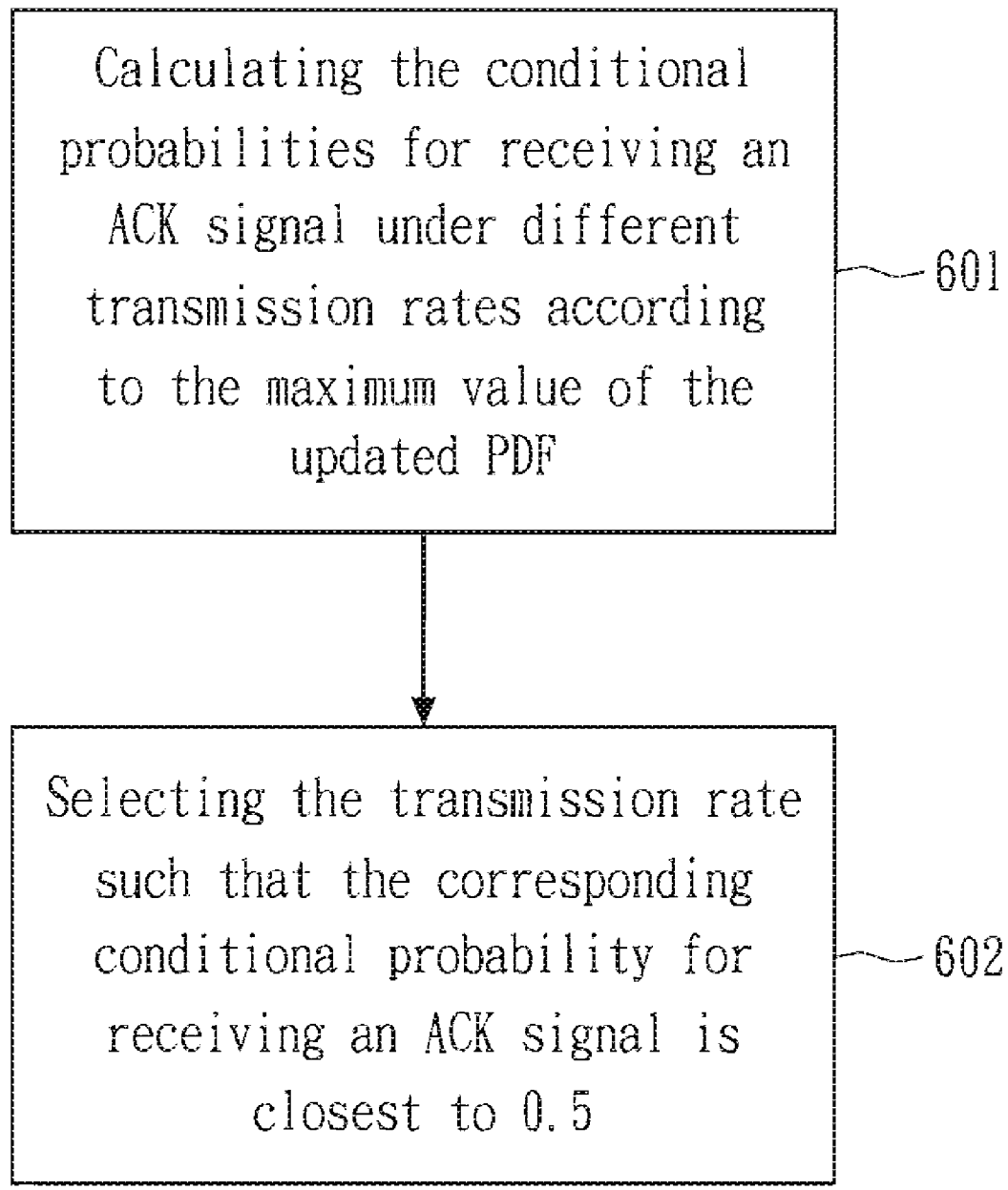
FIG. 6 shows the flow chart of a method for determining transmission rate according to the probability density function of one embodiment of the present invention.

FIG. 6 shows the flow chart of a method in step 102 for determining transmission rate according to probability density function. In step 601, the conditional probabilities for receiving an ACK signal under different transmission rates are calculated according to the maximum value of the updated probability density function, and step 602 is executed. In step 602, the transmission rate, such that the corresponding conditional probability for receiving an ACK signal is closest to 0.5, is selected as the transmission rate for the transmission signal. The present method can be represented as follows:

$$newMCS = \underset{MCS}{\operatorname{argmin}}(|0.5 - prob(ACK \mid MCS, SNR)|),$$

wherein the SNR can be represented as follows:

$$SNR = \underset{SNR}{\operatorname{argmax}}(prob(SNR \mid ACKs)).$$

That is, the present method uses a concept similar to the average entropy in information theory such that the transmission rate at which the communication system can transmit the most information is selected to help the convergence of the probability density function.

Figure 7:
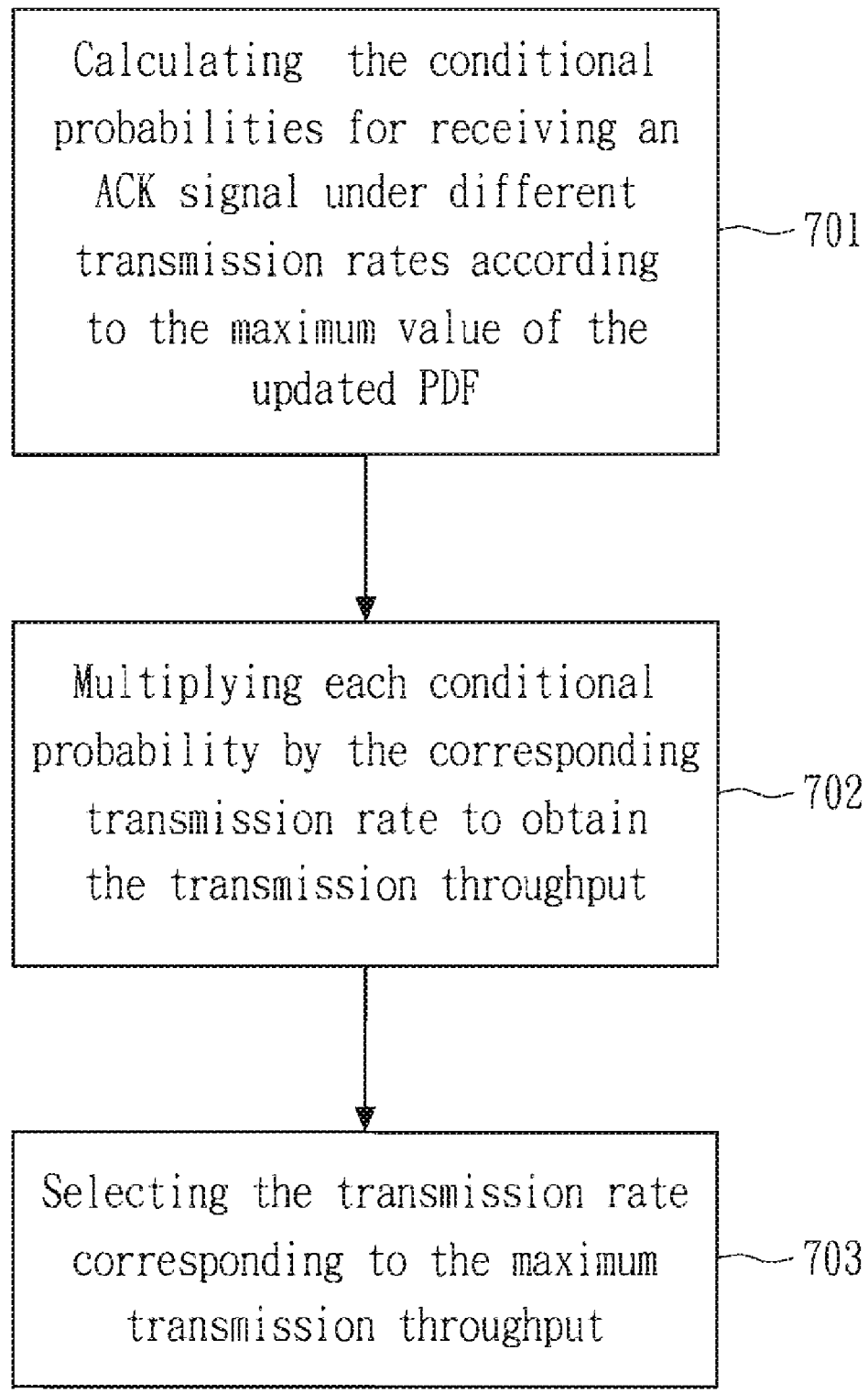
FIG. 7 shows the flow chart of a method for determining transmission rate according to the probability density function of another embodiment of the present invention.

FIG. 7 shows the flow chart of another method in step 102 for determining transmission rate according to probability density function. In step 701, the conditional probabilities for receiving an ACK signal under different transmission rates are calculated according to the maximum value of the updated probability density function, and step 702 is executed. In step 702, each conditional probability is multiplied by the corresponding transmission rate to obtain the transmission throughput, and step 703 is executed. In step 703, the transmission rate corresponding to the maximum transmission throughput is selected as the transmission rate for the transmission signal. The present method can be represented as follows:

$$newMCS = \underset{MCS}{\operatorname{argmax}}(datarate(MCS) \times prob(ACK \mid MCS, SNR)).$$

That is, the present method selects the transmission rate for each update such that the communication system can achieve the highest transmission throughput.

Figure 8:
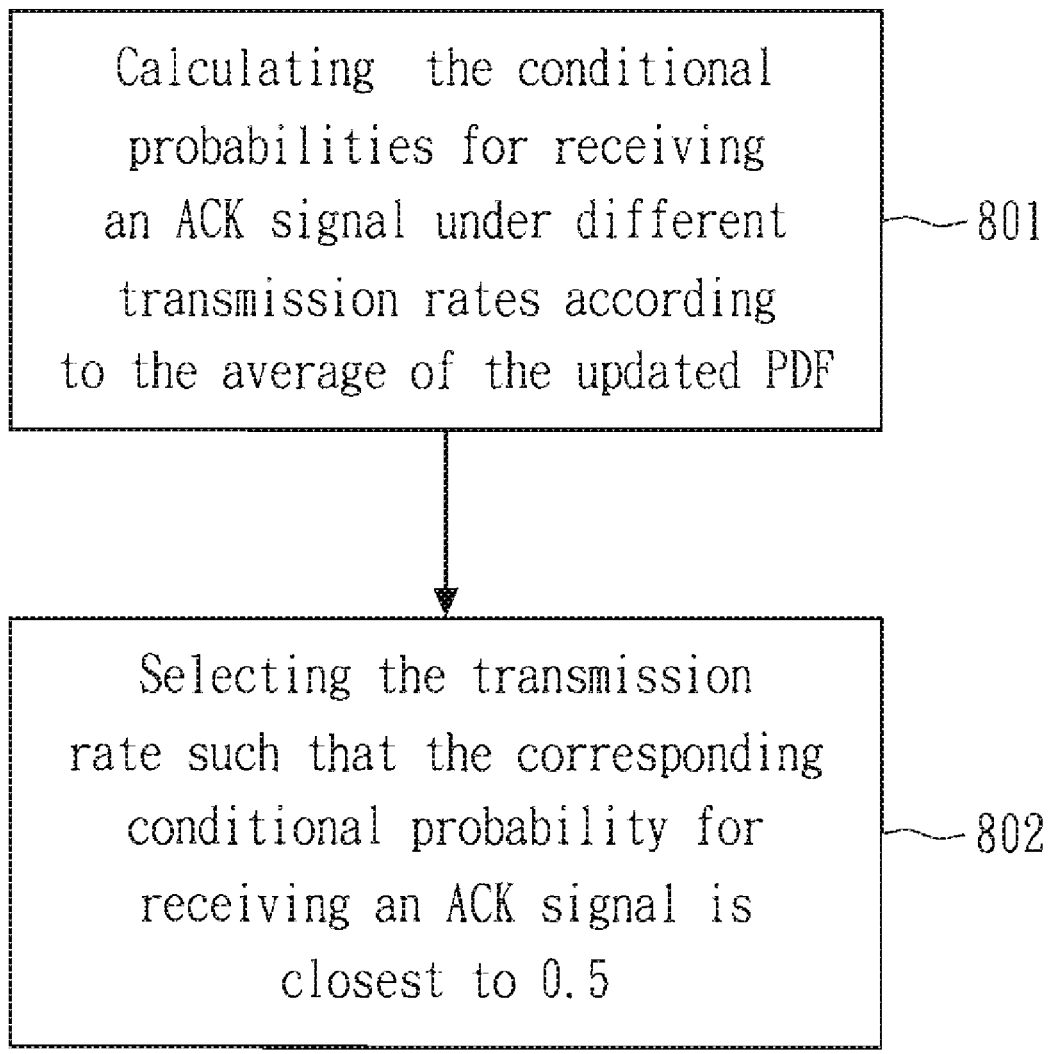
FIG. 8 shows the flow chart of a method for determining transmission rate according to the probability density function of yet another embodiment of the present invention.

FIG. 8 shows the flow chart of yet another method in step 102 for determining transmission rate according to probability density function. In step 801, the conditional probabilities for receiving an ACK signal under different transmission rates are calculated according to the average of the updated probability density function, and step 802 is executed. In step 802, the transmission rate, such that the corresponding conditional probability for receiving an ACK signal is closest to 0.5, is selected as the transmission rate for the transmission signal. The present method can be represented as follows:

$$newMCS = \underset{MCS}{\operatorname{argmin}}(|0.5 - prob(ACK \mid MCS)|),$$

wherein prob(ACK|MCS) can be represented as follows:

prob(ACK|MCS)=∫prob(ACK|MCS,SNR)P(SNR|ACKs)dSNR

The present method is similar to the method shown in FIG. 6 such that the present method selects the transmission rate at which the communication system can transmit the most information to help the convergence of the probability density function. However, unlike the method shown in FIG. 6, the maximum value of SNR is not selected. Instead, the conditional probability is integrated on the basis of SNR to obtain the average conditional probability to SNR.

Figure 9:
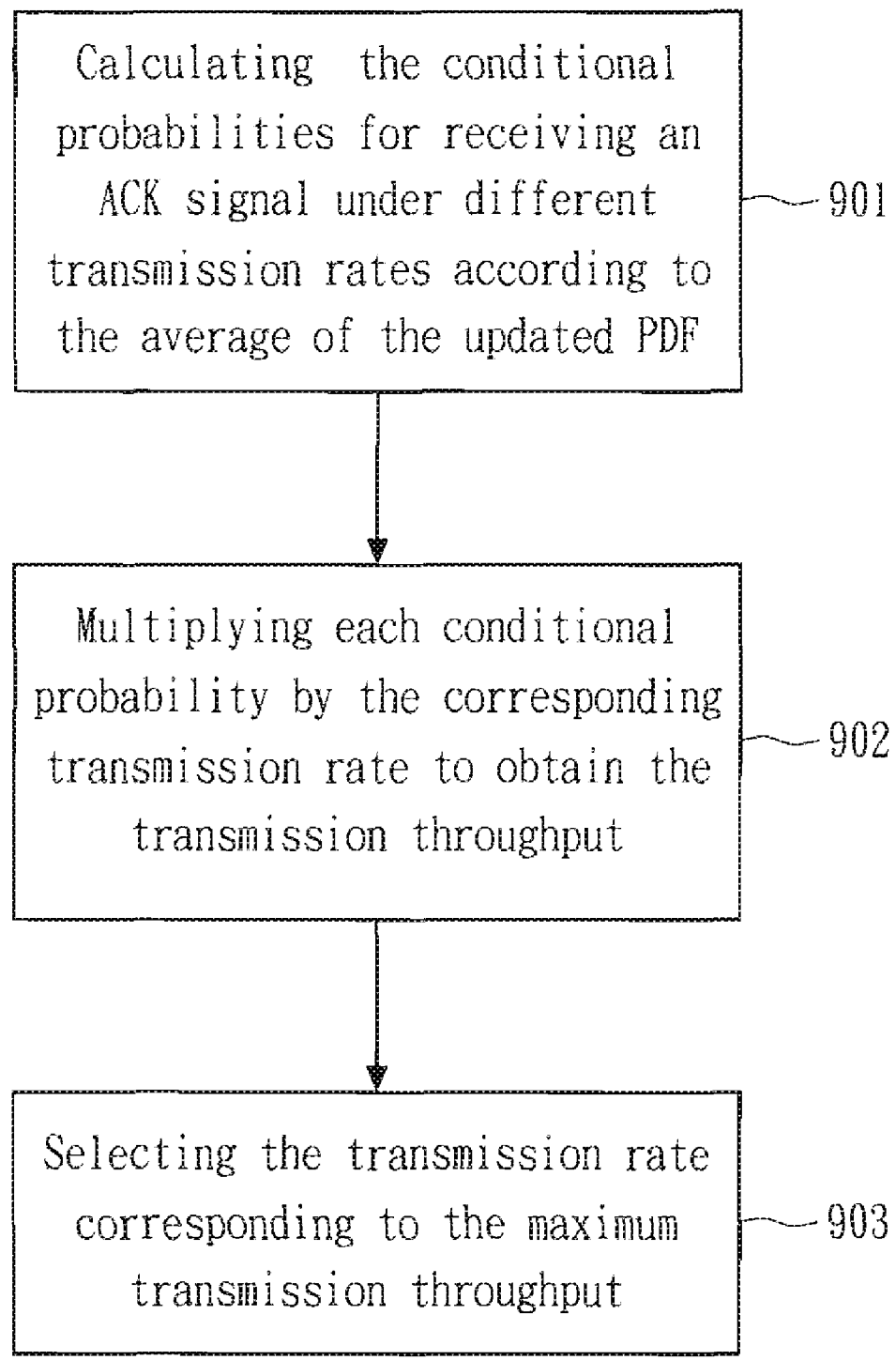
FIG. 9 shows the flow chart of a method for determining transmission rate according to the probability density function of yet another embodiment of the present invention.

FIG. 9 shows the flow chart of yet another method in step 102 for determining transmission rate according to probability density function. In step 901, the conditional probabilities for receiving an ACK signal under different transmission rates are calculated according to the average of the updated probability density function, and step 902 is executed. In step 902, each conditional probability is multiplied by the corresponding transmission rate to obtain the transmission throughput, and step 903 is executed. In step 903, the transmission rate corresponding to the maximum transmission throughput is selected as the transmission rate for the transmission signal.

The present method can be represented as follows:

$$newMCS = \underset{MCS}{\operatorname{argmax}}(datarate(MCS) \times prob(ACK \mid MCS)),$$

wherein prob(ACK|MCS) can be represented as follows:

prob(ACK|MCS)=∫prob(ACK|MCS,SNR)P(SNR|ACKs)dSNR

The present method is similar to the method shown in FIG. 7 such that for each update, the transmission rate is selected such that the communication system can achieve the highest transmission throughput. However, unlike the method shown in FIG. 6, the maximum value of SNR is not selected. Instead, the conditional probability is integrated on the basis of SNR to obtain the average conditional probability to SNR.

Figure 10:
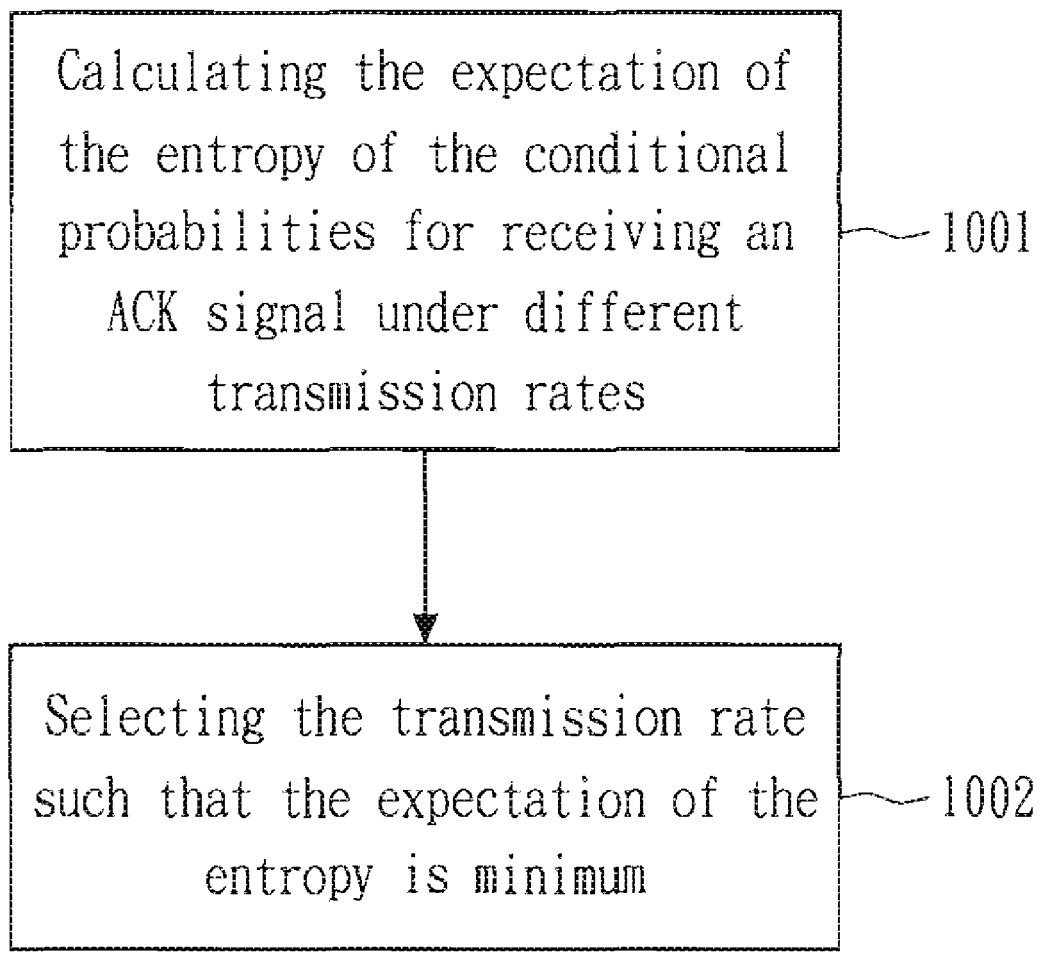
FIG. 10 shows the flow chart of a method for determining transmission rate according to the probability density function of yet another embodiment of the present invention.

FIG. 10 shows the flow chart of yet another method in step 102 for determining transmission rate according to probability density function. In step 1001, the expectation of the entropy of the conditional probabilities for receiving an ACK signal under different transmission rates are calculated, and step 1002 is executed. In step 1002, the transmission rate such that the expectation of the entropy is minimum is selected as the transmission rate for the transmission signal. The present method can be represented as follows:

$$newMCS = \underset{MCS}{\operatorname{argmin}}(E(entropy(MCS))),$$

wherein E(entropy(MCS)) can be represented as follows:

$$E(entropy(MCS)) = prob(ACK \mid MCS) \times$$
$$entropy(P(SNR \mid oldprobings, newACK, newMCS)) +$$
$$(1 - prob(ACK \mid MCS)) \times$$
$$entropy(P(SNR \mid oldprobings, newNACK, newMCS)),$$

wherein old probings represents RSSI, MCSs and ACK signals.

The present invention selects the transmission rate corresponding to the minimum expectation of entropy such that the calculated probability density function of the SNR of the transmission signal is closest to the real probability density function of the SNR of the transmission signal to help the convergence of the probability density function.

In conclusion, probing signals are not used in the rate adaptation method in the embodiments of the present invention. Therefore, the transmission throughput is not reduced. On the other hand, the rate adaptation method in the embodiments of the present invention updates the transmission rate as soon as an ACK signal or a NACK signal is received. Therefore, the convergence speed is faster than that of the conventional methods. In addition, the rate adaptation method in the embodiments of the present invention updates the transmission rate based on all of the received ACK signals and NACK signals, rather than counting the received ACK signals and NACK signals in a specific period of time. Therefore, the rate adaptation method in the embodiments of the present invention is less likely to be affected by temporary environmental factors, and therefore can update to a more suitable transmission rate than the conventional methods.

The above-described embodiments of the present invention are intended to be illustrative only. Those skilled in the art may devise numerous alternative embodiments without departing from the scope of the following claims.

What is claimed is:

1. A rate adaptation method for a communication device, comprising the steps of: updating a probability density function of a signal to noise ratio of a transmission signal by a computation device according to the probability density function and a receiving status of the transmission signal; and updating a transmission rate of the transmission signal by the computation device according to the updated probability density function, wherein the step of updating the probability density function comprises the step of multiplying the probability density function before update by a conditional probability for receiving an ACK signal given a transmission rate and signal to noise ratio.

2. The rate adaptation method of claim 1, wherein the receiving status of the transmission signal comprises whether a completeness (ACK) signal or a failure (NACK) signal is received.

3. The rate adaptation method of claim 1, wherein the step of updating the probability density function is executed at the same time that an ACK signal or an NACK signal is received.

4. The rate adaptation method of claim 2, wherein if no signal is received for a specific period of time, then it is determined that a NACK signal is received.

5. The rate adaptation method of claim 1, wherein the probability density function is represented as follows:

$$p(SNR \mid RSSI, ACKs, MCSs) = \frac{p(SNR \mid RSSI) \prod_{i=0}^{N} p(SNR \mid ACKi, MCSi)}{p(SNR)^{N+1}},$$

wherein SNR represents a signal to noise ratio, RSSI represents a received signal strength indication, ACK represents an ACK signal, MCS represents a transmission rate and N represents the number of update times.

6. The rate adaptation method of claim 1, wherein the step of updating the probability density function further comprises the step of dividing the probability density function before update by the conditional probability for receiving an ACK signal given the transmission rate.

7. The rate adaptation method of claim 6, wherein the step of updating the probability density function is represented as follows:

$$p(SNR \mid RSSI, ACKs, MCSs) = p(SNR \mid RSSI) \prod_{i=0}^{N} \frac{p(ACKi \mid MCSi, SNR)}{p(ACKi \mid MCSi)},$$

wherein SNR represents a signal to noise ratio, RSSI represents a received signal strength indication, ACK represents an ACK signal, MCS represents a transmission rate and N represents the number of update times.

8. The rate adaptation method of claim 1, wherein the step of updating the transmission rate comprises the steps of:
calculating conditional probabilities for receiving an ACK signal under different transmission rates according to a maximum value of the updated probability density function; and
selecting the transmission rate such that the corresponding conditional probability for receiving an ACK signal is closest to 0.5 as the transmission rate for the transmission signal.

9. The rate adaptation method of claim 8, wherein the step of updating the transmission rate is represented as follows:

$$newMCS = \underset{MCS}{\mathrm{argmin}}(|0.5 - prob(ACK \mid MCS, SNR)|),$$

wherein arg min stands for argument of the minimum, ACK represents an ACK signal, MCS represents a transmission rate and SNR represents a signal to noise ratio, and is calculated as follows:

$$SNR = \underset{SNR}{\mathrm{argmax}}(prob(SNR \mid ACKs)),$$

wherein arg max stands for argument of the maximum.

10. The rate adaptation method of claim 1, wherein the step of updating the transmission rate comprises the steps of:
calculating conditional probabilities for receiving an ACK signal under different transmission rates according to a maximum value of the updated probability density function;
multiplying each conditional probability by a corresponding transmission rate to obtain a transmission throughput; and
selecting the transmission rate corresponding to the maximum transmission throughput as the transmission rate for the transmission signal.

11. The rate adaptation method of claim 10, wherein the step of updating the transmission rate is represented as follows:

$$newMCS = \underset{MCS}{\mathrm{argmax}}(datarate(MCS) \times prob(ACK \mid MCS, SNR)),$$

wherein arg max stands for argument of the maximum, ACK represents an ACK signal, MCS represents a transmission rate and SNR represents a signal to noise ratio.

12. The rate adaptation method of claim 1, wherein the step of updating the transmission rate comprises the steps of:
calculating conditional probabilities for receiving an ACK signal under different transmission rates according to an average of the updated probability density function; and
selecting the transmission rate such that the corresponding conditional probability for receiving an ACK signal is closest to 0.5 as the transmission rate for the transmission signal.

13. The rate adaptation method of claim 12, wherein the step of updating the transmission rate is represented as follows:

$$newMCS = \underset{MCS}{\mathrm{argmin}}(|0.5 - prob(ACK \mid MCS)|),$$

wherein arg min stands for argument of the minimum, ACK represents an ACK signal, MCS represents a transmission rate and prob(ACK|MCS) is calculated as follows:

$$prob(ACK|MCS) = \int prob(ACK|MCS,SNR) P(SNR|ACKs) dSNR.$$

14. The rate adaptation method of claim 1, wherein the step of updating the transmission rate comprises the steps of:
calculating conditional probabilities for receiving an ACK signal under different transmission rates according to an average of the updated probability density function;
multiplying each conditional probability by a corresponding transmission rate to obtain a transmission throughput; and selecting the transmission rate corresponding to the maximum transmission throughput as the transmission rate for the transmission signal.

15. The rate adaptation method of claim 14, wherein the step of updating the transmission rate is represented as follows:

$$newMCS = \underset{MCS}{\operatorname{argmax}}(datarate(MCS) \times prob(ACK \mid MCS)),$$

wherein arg max stands for argument of the maximum, ACK represents ACK signal, MCS represents transmission rate and prob(ACK|MCS) is calculated as follows:

prob(ACK|MCS)=∫prob(ACK|MCS,SNR)$P$(SNR|ACKs)$d$SNR.

16. The rate adaptation method of claim 1, wherein the step of updating the transmission rate comprises the steps of:

calculating an expectation of an entropy of a conditional probabilities for receiving an ACK signal under different transmission rates; and selecting the transmission rate such that the expectation of the entropy is minimum as the transmission rate for the transmission signal.

17. The rate adaptation method of claim 16, wherein the step of updating the transmission rate is represented as follows:

$$newMCS = \underset{MCS}{\operatorname{argmin}}(E(\text{entropy}(MCS))),$$

wherein arg min stands for argument of the minimum, MCS represents a transmission rate and E(entropy (MCS)) is calculated as follows:

$E(\text{entropy}(MCS)) = prob(ACK \mid MCS) \times$ $\text{entropy}(P(SNR \mid RSSI, oldMCSs, oldACKs, newACK, newMCS)) +$ $(1 - prob(ACK \mid MCS)) \times$ $\text{entropy}(P(SNR \mid oldMCS, oldNACKs, newNACK, newMCS)),$ wherein ACK represents an ACK signal, NACK represents an NACK signal and SNR represents a signal to noise ratio.

18. The rate adaptation method of claim 1, which further comprises the step of:
initializing the probability density function of signal to noise ratio of the transmission signal based on received signal strength indication.

* * * * *